Patented Apr. 25, 1950

2,505,461

UNITED STATES PATENT OFFICE 2,505,461

ALKYLCYCLOHEXYLMETHYLPYRIDINES

Francis E. Cislak, Frank A. Karnatz, and Kathryn Kelley, Indianapolis, Ind., assignors to Reilly Tar & Chemical Corporation, Indianapolis, Ind., a corporation of Indiana No Drawing. Application August 4, 1947,
Serial No. 766,086

11 Claims. (Cl. 260—290)

This invention relates to a new class of chemical compounds and to the process of making them. More particularly it relates to alkylcyclohexylmethylpyridines and to the process of making them. These alkylcyclohexylmethylpyridines have the general formula

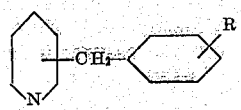

where R represents an alkyl group.

In general the compounds of our present invention may be prepared by reacting sodamide with a pyridine which has the group —CR$_1$R$_2$H substituted in the 2-position, the 4-position, or in both the 2- and the 4-positions (R$_1$ and R$_2$ represent hydrogen, an alkyl, or a cycloalkyl group), and then reacting the resulting compound with an alkylcyclohexylhalide, which has the general formula

where R represents an alkyl group and X represents a halogen.

Our invention will be described more fully in conjunction with the specific examples given below. These examples are given by way of illustration only and our invention is not to be limited by the details set forth therein. The refractive indices are for the D line of sodium and are taken at 20° C.

Example 1

4-(4-ethylcyclohexylmethyl) pyridine.

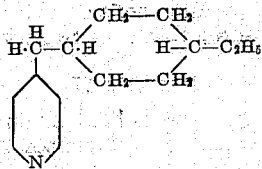

Thirty-four grams of finely divided sodamide, prepared in any suitable manner, is dispersed in 700 cc. of liquid ammonia. To this dispersion of sodamide in liquid ammonia is added eighty-one grams (0.87 mol) of 4-picoline; the picoline is added in small portions to more readily control the reaction; approximately ten minutes is required to add the picoline. About one-half to one hour after all of the picoline has been added, one hundred thirty-five grams (0.7 mol) of 4-ethylcyclohexylbromide is added in small portions; about one-half hour is required to add the bromide. The reaction mixture is mechanically agitated during the addition of the picoline and the bromide; the agitation is continued for from two to six hours after all of the bromide has been added. The 4-(4-ethylcyclohexylmethyl) pyridine formed during the reaction period is isolated in any suitable manner.

One way of isolating the 4-(4-ethylcyclohexylmethyl) pyridine is as follows. The ammonia is evaporated. Water is added to hydrolyse any unreacted sodamide or sodium-picoline compound; upon settling two layers are formed, an aqueous layer and a water insoluble layer. The two layers are separated and the 4-(4-ethylcyclohexylmethyl) pyridine is separated from the water insoluble layer by subjecting it to vacuum fractional distillation.

As so prepared the 4-(4-ethylcyclohexylmethyl) pyridine has a boiling point of about 165° C. at 17 mm. mercury pressure. It has a refractive index of about 1.5112.

The reaction in liquid ammonia may be carried out at atmospheric pressure or it may be conducted at superatmospheric pressure.

We have found it advantageous to react the picoline with the sodamide at a low temperature, even as low as —30° C. High temperatures, above about 80° C., are to be avoided as at the higher temperatures the sodamide reacts with the picoline to give an amino-picoline.

While we prefer liquid ammonia as our reaction medium, we can use other media such as diethyl ether, xylene, or the like.

We prefer, because of convenience, to use 4-ethylcyclohexylmethyl bromide; but we can use the corresponding chloride or iodide and obtain the desired 4-(4-ethylcyclohexylmethyl) pyridine.

Example 2

2-(2-methylcyclohexylmethyl) pyridine. The procedure of Example 1 is followed except that in place of the 4-picoline we use 0.85 mol of 2-picoline and in place of the 4-ethylcyclohexyl bromide we use 0.67 mol of 2-methylcyclohexyl bromide. The 2-(2-methylcyclohexylmethyl) pyridine boils at 145° C. at 14 mm. mercury pressure; it has a refractive index of about 1.5163.

Example 3

2-(4-methylcyclohexylmethyl) pyridine. The procedure of Example 1 is followed except that in place of the 4-picoline we use 0.9 mol of 2-picoline and in place of the 4-ethylcyclohexyl bromide we use 0.74 mol of 4-methylcyclohexyl bromide. The 2-(4-methylcyclohexylmethyl) pyridine boils at 132° C. at 8 mm. mercury pressure; it has a refractive index of about 1.5110.

*Example 4*

2 - (3,4 - dimethylcyclohexylmethyl) pyridine. The procedure of Example 1 is followed except that in place of the 4-picoline we use 0.9 mol of 2-picoline and in place of the 4-ethylcyclohexyl bromide we use 0.73 mol of 3,4-dimethylcyclohexyl bromide. The 2-(3,4-dimethylcyclohexylmethyl) pyridine boils at 111° C. at 3 mm. mercury pressure; it has a refractive index of about 1.5132.

*Example 5*

2 - (2,5 - dimethylcyclohexylmethyl) pyridine. The procedure of Example 1 is followed except that in place of the 4-picoline we use 0.75 mol of 2-picoline and in place of the 4-ethylcyclohexyl bromide we use 0.58 mol of 2,5-dimethylcyclohexyl bromide. The 2-(2,5-dimethylcyclohexylmethyl) pyridine boils at 132° C. at 6 mm. mercury pressure; it has a refractive index of about 1.5137.

*Example 6*

2 - (3,5 - dimethylcyclohexylmethyl) pyridine. The procedure of Example 1 is followed except that in place of the 4-picoline we use 0.7 mol of 2-picoline and in place of the 4-ethylcyclohexyl bromide we use 0.55 mol of 3,5-dimethylcyclohexyl bromide. The 2-(3,5-dimethylcyclohexylmethyl) pyridine boils at 153° C. at 18 mm. mercury pressure; it has a refractive index of about 1.5112.

*Example 7*

2-(3-ethylcyclohexylmethyl) pyridine. The procedure of Example 1 is followed except that in place of the 4-picoline we use 1.0 mol of 2-picoline and in place of the 4-ethylcyclohexyl bromide we use 0.8 mol of 3-ethylcyclohexyl bromide. The 2-(3-ethylcyclohexylmethyl) pyridine boils at 156° C. at 17 mm. mercury pressure; it has a refractive index of about 1.5100.

*Example 8*

2-(4-ethylcyclohexylmethyl) pyridine. The procedure of Example 1 is followed except that in place of the 4-picoline we use 0.87 mol of 2-picoline. The 2-(4-ethylcyclohexylmethyl) pyridine boils at 162° C. at 17 mm. mercury pressure; it has a refractive index of about 1.5093.

*Example 9*

4-(2-methylcyclohexylmethyl) pyridine. The procedure of Example 1 is followed except that 0.9 mol of 4-picoline is used and in place of the 4-ethylcyclohexyl bromide we use 0.73 mol of 2-methylcyclohexyl bromide. The 4-(2-methylcyclohexylmethyl) pyridine boils at 152° C. at 15 mm. mercury pressure; it has a refractive index of about 1.5168.

*Example 10*

4-(3-methylcyclohexylmethyl) pyridine. The procedure of Example 1 is followed except that 1.0 mol of 4-picoline is used and in place of the 4-ethylcyclohexyl-bromide we use 0.77 mol of 3-methylcyclohexyl bromide. The 4-(3-methylcyclohexylmethyl) pyridine boils at 111° C. at 3 mm. mercury pressure; it has a refractive index of about 1.5140.

*Example 11*

4-(4-methylcyclohexylmethyl) pyridine. The procedure of Example 1 is followed except that 0.7 mol of 4-picoline is used and in place of the 4-ethylcyclohexyl bromide we use 0.56 mol of 4-methylcyclohexyl bromide. The 4-(4-methylcyclohexylmethyl) pyridine boils at 117° C. at 3 mm. mercury pressure; it has a refractive index of about 1.5130.

*Example 12*

4-(2,4-dimethylcyclohexylmethyl) pyridine. The procedure of Example 1 is followed except that 1.0 mol of 4-picoline is used and in place of the 4-ethylcyclohexyl bromide we use 0.82 mol of 2,4-dimethylcyclohexyl bromide. The 4-(2,4-dimethylcyclohexylmethyl) pyridine boils at 116° C. at 3 mm. mercury pressure; it has a refractive index of about 1.5112.

*Example 13*

4 - (3,4 - dimethylcyclohexylmethyl) pyridine. The procedure of Example 1 is followed except that 0.95 mol of 4-picoline is used and in place of the 4-ethylcyclohexyl bromide we use 0.76 mol of 3,4-dimethylcyclohexyl bromide. The 4-(3,4-dimethylcyclohexylmethyl) pyridine boils at 127° C. at 3 mm. mercury pressure; it has a refractive index of about 1.5136.

*Example 14*

4 - (2,5 - dimethylcyclohexylmethyl) pyridine. The procedure of Example 1 is followed except that 0.75 mol of 4-picoline is used and in place of the 4-ethylcyclohexyl bromide we use 0.6 mol of 2,5-dimethylcyclohexyl bromide. The 4-(2,5-dimethylcyclohexylmethyl) pyridine boils at 120° C. at 3 mm. mercury pressure; it has a refractive index of about 1.5117.

*Example 15*

4 - (3,5 - dimethylcyclohexylmethyl) pyridine. The procedure of Example 1 is followed except that 0.75 mol of 4-picoline is used and in place of the 4-ethylcyclohexyl bromide we use 0.59 mol of 3,5-dimethylcyclohexyl bromide. The 4-(3,5-dimethylcyclohexylmethyl) pyridine boils at 159° C. at 18 mm. mercury pressure; it has a refractive index of about 1.5094.

*Example 16*

4 - (3 - ethylcyclohexylmethyl) pyridine. The procedure of Example 1 is followed except that 1.0 mol of 4-picoline is used and in place of the 4-ethylcyclohexyl bromide we use 0.8 mol of 3-ethylcyclohexyl bromide. The 4-(3-ethylcyclohexylmethyl) pyridine boils at 164° C. at 17 mm. mercury pressure; it has a refractive index of about 1.5121.

*Example 17*

4 - (3 - methyl-5-ethylcyclohexylmethyl) pyridine. The procedure of Example 1 is followed except that 0.8 mol of 4-picoline is used and in place of the 4-ethylcyclohexyl bromide we use 0.65 mol of 3-methyl-5-ethylcyclohexyl bromide. The 4-(3-methyl-5-ethylcyclohexylmethyl) pyridine boils at 163° C. at 13 mm. mercury pressure; it has a refractive index of about 1.5104.

*Example 18*

2-methyl-6-(2-methylcyclohexylmethyl) pyridine. The procedure of Example 1 is followed except that in place of 4-picoline we use 0.85 mol of 2,6-lutidine and in place of 4-ethylcyclohexyl bromide we use 0.67 mol of 2-methylcyclohexyl bromide. The 2-methyl-6-(2-methylcyclohexylmethyl) pyridine boils at 150° C. at 17 mm. mercury pressure; it has a refractive index of about 1.5138.

Example 19

2-methyl-6-(3-methylcyclohexylmethyl) pyridine. The procedure of Example 1 is followed except that in place of 4-picoline we use 1.0 mol of 2,6-lutidine and in place of 4-ethylcyclohexyl bromide we use 0.77 mol of 3-methylcyclohexyl bromide. The 2-methyl-6-(3-methylcyclohexylmethyl) pyridine boils at 111° C. at 3 mm. mercury pressure. It has a refractive index of about 1.5104.

Example 20

2-methyl-6-(4-methylcyclohexylmethyl) pyridine. The procedure of Example 1 is followed except that in place of 4-picoline we use 0.9 mol of 2,6-lutidine and in place of 4-ethylcyclohexyl bromide we use 0.72 mol of 4-methylcyclohexyl bromide. The 2-methyl-6-(4-methylcyclohexylmethyl) pyridine boils at 124° C. at 9 mm. mercury pressure. It has a refractive index of about 1.5097.

Example 21

2-methyl-6-(2,4-dimethylcyclohexylmethyl) pyridine. The procedure of Example 1 is followed except that in place of 4-picoline we use 1.0 mol of 2,6-lutidine and in place of 4-ethylcyclohexyl bromide we use 0.82 mol of 2,4-dimethylcyclohexyl bromide. The 2-methyl-6-(2,4-dimethylcyclohexylmethyl) pyridine boils at 113° C. at 3 mm. mercury pressure; it has a refractive index of about 1.5109.

Example 22

2,6-dimethyl-4-(3-methylcyclohexylmethyl) pyridine. The procedure of Example 1 is followed except that in place of 4-picoline we use 0.8 mol of 2,4,6-collidine and in place of 4-ethylcyclohexyl bromide we use 0.65 mol of 3-methylcyclohexyl bromide. The 2,6-dimethyl-4-(3-methylcyclohexylmethyl) pyridine boils at 149° C. at 7 mm. mercury pressure; it has a refractive index of about 1.5120.

The compounds of our present invention are particularly effective fungicides and are useful in controlling and or mitigating mycosis. They are also of interest in the preparation of rubber chemicals and as intermediates in various organic syntheses.

We claim as our invention:

1. The class of compounds consisting of 2-alkylcyclohexylmethylpyridines and 4-alkylcyclohexylmethylpyridines having the general formula

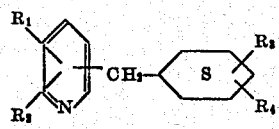

where $R_1$ and $R_2$ represent one of the class consisting of a methyl group and hydrogen, $R_3$ represents an alkyl group, and $R_4$ represents one of the class consisting of an alkyl group and hydrogen.

2. The class of compounds of claim 1 in which the alkylcyclohexylmethyl group is attached to the 4-position of the pyridine ring.

3. The class of compounds of claim 1 in which the alkylcyclohexylmethyl group is attached to the 2-position of the pyridine ring.

4. The process of preparing compounds of claim 1 which comprises reacting sodamide with a methylpyridine of the class consisting of a 2-methyl substituted pyridine, a 4-methyl substituted pyridine, a 2-methyl-4-methyl substituted pyridine, and a 2-methyl-6-methyl pyridine; and then reacting the resulting compound with an alkylcyclohexylhalide having the general formula:

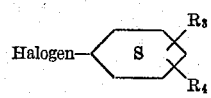

where $R_3$ represents an alkyl group, and $R_4$ represents one of the class consisting of an alkyl group and hydrogen.

5. The process of claim 1 in which the pyridine used is a 2-substituted pyridine.

6. The process of claim 1 in which the pyridine used is a 4-substituted pyridine.

7. The process of claim 1 in which the pyridine used is a 4-methylpyridine and the alkylcyclohexylhalide is a 4-ethylcyclohexylhalide.

8. The process of claim 7 in which the pyridine used is 4-methylpyridine.

9. The compound, 4-(4-ethylcyclohexylmethyl) pyridine whose structural formula is

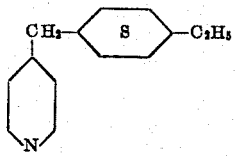

10. The compound, 4-(3-methyl-5-ethylcyclohexylmethyl) pyridine whose structural formula is

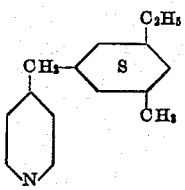

11. The compound, 4-(3,5-dimethylcyclohexylmethyl) pyridine whose structural formula is

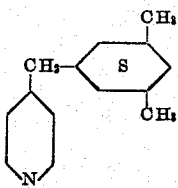

FRANCIS E. CISLAK.
FRANK A. KARNATZ.
KATHRYN KELLEY.

REFERENCES CITED

The following references are of record in the file of this patent:

UNITED STATES PATENTS

| Number | Name | Date |
| --- | --- | --- |
| 2,247,266 | Pieter | June 24, 1941 |

OTHER REFERENCES

Chichibabin Chem. Abstracts, vol. 30 (1936), pp. 8208, 8209.